(12) United States Patent
Wang et al.

(10) Patent No.: US 10,975,259 B2
(45) Date of Patent: Apr. 13, 2021

(54) COATING COMPOSITION FOR STAIN RESISTANT COATINGS

(71) Applicant: PPG Industries Ohio, Inc., Cleveland, OH (US)

(72) Inventors: Maria Wang, Allison Park, PA (US); Katie L. McGrane, Pittsburgh, PA (US); Shanti Swarup, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 72 days.

(21) Appl. No.: 16/521,850

(22) Filed: Jul. 25, 2019

(65) Prior Publication Data

US 2021/0024771 A1 Jan. 28, 2021

(51) Int. Cl.
*C09D 133/06* (2006.01)
*C09D 5/00* (2006.01)

(52) U.S. Cl.
CPC ........... *C09D 133/068* (2013.01); *C09D 5/00* (2013.01); *C09D 133/062* (2013.01)

(58) Field of Classification Search
CPC ... C09D 133/068; C09D 133/062; C09D 5/00
USPC ....................................................... 524/502
See application file for complete search history.

(56) References Cited

U.S. PATENT DOCUMENTS

| | | | |
|---|---|---|---|
| 5,827,612 A * | 10/1998 | Girgis | C03C 25/28 428/378 |
| 6,399,691 B1 | 6/2002 | Melchiors et al. | |
| 6,881,786 B2 | 4/2005 | Swarup et al. | |
| 6,884,845 B2 | 4/2005 | Swarup et al. | |
| 7,199,178 B2 | 4/2007 | Melchiors et al. | |
| 8,242,211 B2 | 8/2012 | Swarup et al. | |
| 9,120,916 B1 * | 9/2015 | Swarup | C08G 18/6229 |
| 2003/0216515 A1 | 11/2003 | Swarup et al. | |
| 2004/0259994 A1 | 12/2004 | Yeh et al. | |
| 2005/0131132 A1 * | 6/2005 | Huybrechts | C08G 18/6254 524/556 |
| 2010/0099809 A1 | 4/2010 | Ohsuka et al. | |
| 2010/0190923 A1 | 7/2010 | Swarup et al. | |
| 2016/0168411 A1 * | 6/2016 | Wang | C09D 133/08 524/424 |
| 2017/0335129 A1 | 11/2017 | Wang et al. | |
| 2018/0171169 A1 * | 6/2018 | Singer | C09D 7/61 |

* cited by examiner

*Primary Examiner* — Michael Bernshteyn
(74) *Attorney, Agent, or Firm* — Michael J. Grese

(57) ABSTRACT

A coating composition includes: (a) a first acrylic polymer formed from a reaction mixture including: (i) an ethylenically unsaturated monomer including an acid group or an amine group; (ii) a reactive solvent reactive with the ethylenically unsaturated monomer (i); and (iii) a second monomer reactive with ethylenically unsaturated monomer (i); and (b) a second acrylic polymer different from the first acrylic polymer, where the second acrylic polymer (b) has a Mw of at least 100,000 Da. A method of preparing such a coating composition and coatings and coated substrates formed therefrom are also disclosed. Coatings formed from the disclosed coating composition may exhibit improved stain resistance.

20 Claims, No Drawings

COATING COMPOSITION FOR STAIN RESISTANT COATINGS

FIELD OF THE INVENTION

The present invention relates to a coating composition for imparting stain resistance, a method of preparing such a coating composition, and coatings and coated substrates with improved stain resistance derived therefrom.

BACKGROUND OF THE INVENTION

Substrates coated by a coating composition and coalesced to form a coating thereon commonly become stained as the result of everyday traffic in the area surrounding the coated substrate. Stain resistance of a coating refers to the resistance to stain, difficulty of being wetted by stain, difficulty of being adhered to by stain, and/or ease of stain removal.

SUMMARY OF THE INVENTION

The present invention includes a coating composition including: (a) a first acrylic polymer formed from a reaction mixture including: (i) an ethylenically unsaturated monomer including an acid group or an amine group; (ii) a reactive solvent reactive with the ethylenically unsaturated monomer (i); and (iii) a second monomer reactive with ethylenically unsaturated monomer (i); and (b) a second acrylic polymer different from the first acrylic polymer, where the second acrylic polymer (b) has a Mw of at least 100,000 Da.

The present invention also includes a method of preparing a coating composition for imparting improved stain resistance including: reacting to form (a) a first acrylic polymer: (i) an ethylenically unsaturated monomer including an acid group or an amine group; (ii) a reactive solvent reactive with the ethylenically unsaturated monomer (i); and (iii) a second monomer reactive with ethylenically unsaturated monomer (i); and mixing (b) a second acrylic polymer different from the first acrylic polymer (a) with the first acrylic polymer (a) to form a coating composition, where the second acrylic polymer (b) has a Mw of at least 100,000.

DESCRIPTION OF THE INVENTION

For the purposes of the following detailed description, it is to be understood that the invention may assume various alternative variations and step sequences, except where expressly specified to the contrary. It is also to be understood that the specific compositions, coated substrates, and methods described in the following specification are simply exemplary embodiments of the invention. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As used herein, the transitional term "comprising" (and other comparable terms, e.g., "containing" and "including") is "open-ended" and open to the inclusion of unspecified matter. Although described in terms of "comprising", the terms "consisting essentially of" and "consisting of" are also within the scope of the invention.

The term "reactive" refers to a functional group capable of undergoing a chemical reaction with itself and/or other functional groups spontaneously or upon the application of heat or in the presence of a catalyst or by any other means known to those skilled in the art.

As used herein, the term "dispersion" refers to a two-phase system in which one phase includes finely divided particles (e.g. having diameters of less than 500 nm) distributed throughout a second phase, which is a continuous phase.

As used herein, the term "aqueous", "aqueous phase", "aqueous medium", and the like, refers to a medium that either consists exclusively of water or comprises predominantly water (e.g. at least 50 wt % water, such as at least 60 wt %, such as 70 wt %, such as 80 wt %, or such as 90 wt %) in combination with another material, such as, for example, an organic solvent. The amount of organic solvent present in the aqueous dispersions of the present invention may be less than 20 wt %, such as less than 10 wt %, or, in some cases, less than 5 wt %, or, in yet other cases, less than 2 wt %, with the wt % s being based on the total weight of the dispersion. Non-limiting examples of suitable organic solvents are propylene glycol monobutyl ether, ethylene glycol monohexyl ether, ethylene glycol monobutyl ether, n-butanol, benzyl alcohol, and mineral spirits.

The term "polymer", which is used interchangeably with "resin" is meant to encompass oligomers, and includes without limitation both homopolymers and copolymers. By "prepolymer" it is meant a polymer produced as an intermediate stage that is further reacted before polymerization is complete.

The term "coalesced" refers to the process by which a coating composition hardens to form a coating. Coalescing may include the coating composition being cured (e.g. hardening by being crosslinked, either by itself or via a crosslinking agent) or the coating composition being dried.

The coating composition of the present invention, when applied to a substrate and coalesced to form a coating, results in a coating exhibiting good stain resistance. Stain resistance of a coating refers to the resistance to stain, difficulty of being wetted by stain, difficulty of being adhered to by stain, and/or ease of stain removal.

The coating composition of the present invention includes: (a) a first acrylic polymer formed from a reaction mixture of: (i) a first ethylenically unsaturated monomer comprising an acid group or an amine group; (ii) a reactive solvent reactive with the first ethylenically unsaturated monomer (i); and (iii) a second monomer reactive with first ethylenically unsaturated monomer (i); and (b) a second acrylic polymer different from the first acrylic polymer (a), wherein the second acrylic polymer (b) has a Mw of at least 100,000 Da. All weight average molecular weight (Mw) or number average molecular weight (Mn) values disclosed herein are as determined by gel permeation chromatography using a polystyrene standard according to ASTM D6579-11 (performed using a Waters 2695 separation module with a Waters 2414 differential refractometer (RI detector); tetrahydrofuran (THF) was used as the eluent at a flow rate of 1 ml/min, and two PLgel Mixed-C (300×7.5 mm) columns were used for separation at the room temperature (20° C.-27° C.); weight and number average molecular weight of polymeric samples can be measured by gel permeation chromatography relative to linear polystyrene standards of 800 to 900,000 Da) unless specified otherwise.

The first ethylenically unsaturated monomer (i) of the reaction mixture used to form the first acrylic polymer (a) may include an ethylenically unsaturated acid functional monomer, such as an acrylic acid functional monomer. Suitable first ethylenically unsaturated monomers (i) include, but are not limited to, monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate. The polymer resulting from including an acid functional monomer as the first ethylenically unsaturated monomer (i) may be neutralized using an amine, and the polymer may be an anionic polymer.

The first ethylenically unsaturated monomer (i) may include an ethylenically unsaturated monomer containing a primary or secondary amine reactive with the reactive solvent (ii), such as n-methyl-aminopropyl (meth)acrylate, aminoethyl (meth)acylate, and aminobutyl (meth)acrylate. The polymer resulting from a primary or secondary amine as the first ethylenically unsaturated monomer (i) may be neutralized using an acid, and the polymer may be a cationic polymer.

The first ethylenically unsaturated monomer (i) may be present in the reaction mixture used to form the first acrylic polymer (a) in an amount of at least 5 percent by weight, such as at least 8 percent by weight, or at least 10 percent by weight, based on the total weight of the reaction mixture used to form the first acrylic polymer (a). The first ethylenically unsaturated monomer (i) may be present in the reaction mixture used to form the first acrylic polymer (a) in an amount of up to 30 percent by weight, such as up to 25 percent by weight, or up to 20 percent by weight, based on the total weight of the reaction mixture used to form the first acrylic polymer (a). The first ethylenically unsaturated monomer (i) may be present in the reaction mixture used to form the first acrylic polymer (a) in an amount of from 5 to 30 percent by weight, or from 5 to 25 percent by weight, or from 5 to 20 percent by weight, or from 8 to 30 percent by weight, or from 8 to 25 percent by weight, or from 8 to 20 percent by weight, or from 10 to 30 percent by weight, or from 10 to 25 percent by weight, or from 10 to 20 percent by weight, based on the total weight of the reaction mixture used to form the first acrylic polymer (a).

The reactive solvent (ii) of the reaction mixture used to form the first acrylic polymer (a) may be reactive with the first ethylenically unsaturated monomer (i). As used herein, the term "reactive solvent" means a substance that dissolves a solute resulting in a solution and reacts with at least a portion of the solute. The reactive solvent (ii) may be ethylenically saturated and/or include an oxirane ring reactive with a functional group of the first ethylenically unsaturated monomer (i). The reactive solvent may include, but is not limited to: 1,2-epoxypropane, 1,2-epoxybutane, 2,3-epoxybutane, epoxycyclohexane; 1,2-epoxycyclopentane, and 1,2-epoxycyclohexane ester of 2-ethyl hexane. The reactive solvent (ii) may contain no ethylenically unsaturated functionality. The reactive solvent (ii) may be a liquid.

The reactive solvent (ii) may include a glycidyl ester of an aliphatic saturated carboxylic (e.g., monocarboxylic, dicarboxylic, or tricarboxylic) acid including the following structure:

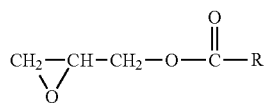

where R may be an aliphatic saturated hydrocarbon radical containing from 4 to 26 carbon atoms or R may be a branched hydrocarbon group having from 8 to 10 carbon atoms, such as neopentyl, neoheptanyl or neodecanyl.

Suitable glycidyl esters of carboxylic acids include CARDURA E10P glycidyl ester, available from Hexion (Columbus, Ohio).

The reactive solvent (ii) may have a number average molecular weight (Mn) of up to 5,000 Da. The reactive solvent (ii) may have a Mn from 50-5,000 Da.

The reactive solvent (ii) may be present in the reaction mixture used to form the first acrylic polymer (a) in an amount of at least 20 percent by weight, such as at least 22 percent by weight, or at least 25 percent by weight, based on the total weight of the reaction mixture used to form the first acrylic polymer (a). The reactive solvent (ii) may be present in the reaction mixture used to form the first acrylic polymer (a) in an amount of up to 60 percent by weight, such as up to 40 percent by weight, or up to 30 percent by weight, based on the total weight of the reaction mixture used to form the first acrylic polymer (a). The reactive solvent (ii) may be present in the reaction mixture used to form the first acrylic polymer (a) in an amount of from 20 to 60 percent by weight, or from 20 to 40 percent by weight, or from 20 to 30 percent by weight, or from 22 to 60 percent by weight, or from 22 to 40 percent by weight, or from 22 to 30 percent by weight, or from 25 to 60 percent by weight, or from 25 to 40 percent by weight, or from 25 to 30 percent by weight, based on the total weight of the reaction mixture used to form the first acrylic polymer (a).

The second monomer (iii) of the reaction mixture used to form the first acrylic polymer (a) may be reactive with the first ethylenically unsaturated monomer (i). The second monomer (iii) may be non-reactive with the reactive solvent (ii) or may be less reactive with the reactive solvent (ii) compared to the first ethylenically unsaturated monomer (i), such that the reactive solvent (ii) would preferentially react with first ethylenically unsaturated monomer (i) than compared to the second monomer (iii).

The second monomer (iii) may include a hydroxyl functional ethylenically unsaturated monomer, such as hydroxyalkyl (meth)acrylates, such as having 2 to 5 carbon atoms in the hydroxyalkyl group, such as hydroxyethyl (meth)acrylate, hydroxypropyl (meth)acrylate, 4-hydroxybutyl (meth) acrylate, hydroxy functional adducts of caprolactone and hydroxyalkyl (meth)acrylates.

The second monomer (iii) may include an ethylenically unsaturated monomer comprising polydialkylsiloxane, such as polydimethylsiloxane, functional groups. Such monomers may be prepared, for example, by reacting a polydialkylsiloxane having hydroxyl end groups with an ethylenically unsaturated monomer that has functional groups reactive with hydroxyl groups, such as acid or epoxy functional groups. Examples of suitable ethylenically unsaturated monomer comprising polydialkylsiloxane functional groups include SILMER Mob (available from Siltech Corporation (Toronto, Canada)), X-22-2426 (available from Shin-Etsu Chemical Co., Ltd. (Tokyo, Japan)), MCR-M07, MCR-M11, MCR-M17, MCR-M22, MCS-M11, MFR-M15, and MFS-M15 (available from Gelest, Inc. (Morrisville, Pa.)), FM-0711, FM-0721, and FM-0725 (available from JNC Corporation (Tokyo, Japan)).

The second monomer (iii) including an ethylenically unsaturated monomer comprising polydialkylsiloxane functional groups may have Mw of from 1,000-30,000. The polydialkylsiloxane group may be at least oligomeric, such that the resulting ethylenically unsaturated monomer may be a macromonomer.

The second monomer (iii) may include a polymerizable ethylenically unsaturated monomer. Suitable examples include, but are not limited to, alkyl esters of acrylic acid or methacrylic acid including aliphatic alkyl esters containing from 1 to 30, and such as 4 to 18 carbon atoms in the alkyl group. Non-limiting examples include: methyl(meth)acrylate, ethyl(meth)acrylate, propyl(meth)acrylate, n-butyl (meth)acrylate, t-butyl(meth)acrylate, 2-ethylhexyl(meth) acrylate, isobornyl (meth)acrylate, dimethylaminoethyl (meth)acrylate, n-butoxy methyl (meth)acrylamide, lauryl (meth)acrylate, cyclohexyl (meth)acrylate, and 3,3,5-trimethylcyclohexyl (meth)acrylate. Other non-limiting examples of suitable monomers include (meth)acrylamide, N,N dialkyl (meth)acrylamides, dimethylaminoethyl (meth) acrylate, vinyl aromatic compounds such as styrene and vinyl toluene, nitriles such as (meth)acrylonitrile, vinyl and vinylidene halides such as vinyl chloride and vinylidene fluoride and vinyl esters such as vinyl acetate. As used herein, "(meth)acrylate" refers to both "acrylate" and "methacrylate".

The second monomer (iii) may be present in the reaction mixture used to form the first acrylic polymer (a) in an amount of at least 10 percent by weight, such as at least 15 percent by weight, or at least 20 percent by weight, based on the total weight of the reaction mixture used to form the first acrylic polymer (a). The second monomer (iii) may be present in the reaction mixture used to form the first acrylic polymer (a) in an amount of up to 50 percent by weight, such as up to 40 percent by weight, such as up to 35 percent by weight, or up to 30 percent by weight, based on the total weight of the reaction mixture used to form the first acrylic polymer (a). The second monomer (iii) may be present in the reaction mixture used to form the first acrylic polymer (a) in an amount of from 10 to 50 percent by weight, or from 10 to 40 percent by weight, or from 10 to 35 percent by weight, or from 10 to 30 percent by weight, or from 15 to 50 percent by weight, or from 15 to 40 percent by weight, or from 15 to 35 percent by weight, or from 15 to 30 percent by weight, or from 10 to 50 percent by weight, or from 20 to 40 percent by weight, or from 20 to 35 percent by weight, or from 20 to 30 percent by weight, based on the total weight of the reaction mixture used to form the first acrylic polymer (a).

The reactive solvent (ii) may be present initially in the reaction mixture as the medium in which components (e.g., the oxirane group of the reactive solvent (ii) and/or the second monomer (iii)) react with acid or amine functional groups present on the first ethylenically unsaturated monomer (i) in the reaction mixture. The functional groups on the first ethylenically unsaturated monomer (i) reacting with the reactive solvent (ii) may be present in the reaction mixture in stoichiometric excess with respect to the functional groups (e.g., epoxy functional groups) in the reactive solvent (ii), such that the reactive solvent (ii) is completely consumed in the reaction, such an addition reaction, with the first ethylenically unsaturated monomer (i). The equivalent ratio of the reactive functional groups from the first ethylenically unsaturated monomer (i) to the reactive functional groups of the reactive solvent (ii) may be at least 1.1:1, such as at least 1.2:1, such as at least 1.25:1. Generally, the reactive functional groups from the first ethylenically unsaturated monomer (i) react with the reactive functional groups of the reactive solvent (ii), which can result in the formation of the corresponding ester group and a secondary hydroxyl group.

The reaction mixture (and also the coating composition including the first acrylic polymer (a) and the second acrylic polymer (b)) may be essentially free of non-reactive organic solvent. As used herein, the term "non-reactive organic solvent" means an organic substance that dissolves a solute resulting in a solution and does not react with the solute. As used herein, "essentially free" means that a composition has less than 5 percent by weight, such as less than 2 percent by weight, less than 1 percent by weight, less than 0.5 percent by weight, less than 0.2 percent by weight, less than 0.1 percent by weight, less than 0.05 percent by weight, or 0 percent by weight non-reactive organic solvents, based on the total weight of the reaction mixture used to form the first acrylic polymer (a) and/or based on the total weight of the coating composition.

The first acrylic polymer (a) may be prepared by polymerizing a mixture of the first ethylenically unsaturated monomer (i) and the second monomer (iii) in the presence of the reactive solvent (ii). The reactive solvent (ii) may function as a reactive diluent for the monomers. Exemplary methods are described in the examples below.

The polymerization described above may be carried out by introducing the first ethylenically unsaturated monomer (i) and the second monomer (iii) to a suitable reactor to which the reactive solvent (ii) is also added. A suitable free radical polymerization initiator may also be added.

Any suitable free radical initiator may be used in the polymerization. Suitable free radical initiators include, but are not limited to, thermal initiators, photoinitiators and oxidation-reduction initiators. Examples of thermal initiators include, but are not limited to, azo compounds, peroxides, and persulfates. Suitable persulfates include, but are not limited to, sodium persulfate and ammonium persulfate. Oxidation-reduction initiators may include, as non-limiting examples, persulfate-bisulfite systems as well as systems utilizing thermal initiators in combination with appropriate metal ions such as iron or copper.

Suitable azo compounds include, but are not limited to, non-water-soluble azo compounds such as 1-1'-azobis(cyclohexanecarbonitrile), 2-2'-azobisisobutyronitrile, 2-2'-azobis(2-methylbutyronitrile), 2-2'-azobis(propionitrile), 2-2'-azobis(2,4-dimethylvaleronitrile), 2-2'-azobis(valeronitrile), 2-(carbamoylazo)-isobutyronitrile and mixtures thereof, and water-soluble azo compounds such as azobis tertiary alkyl compounds including, but not limited to, 4-4'-azobis(4-cyanovaleric acid), 2-2'-azobis(2-methylpropionamidine) dihydrochloride, 2,2'-azobis[2-methyl-N-(2-hydroxyethyl)propionamide], 4,4'-azobis(4-cyanopentanoic acid), 2,2'-azobis(N,N'-dimethyleneisobutyramidine), 2,2'-azobis(2-amidinopropane) dihydrochloride, 2,2'-azobis(N,N'-dimethyleneisobutyramidine) dihydrochloride and mixtures thereof.

Suitable peroxides include, but are not limited to, hydrogen peroxide, methyl ethyl ketone peroxides, benzoyl peroxides, di-t-butyl peroxides, di-t-amyl peroxides, dicumyl peroxides, diacyl peroxides, decanoyl peroxide, lauroyl peroxide, peroxydicarbonates, peroxyesters, dialkyl peroxides, hydroperoxides, peroxyketals, and mixtures thereof.

The first acrylic polymer (a) formed from the above-described reaction mixture may have an average particle size less than 0.5 micron, such as less than 0.2 micron or less than 0.1 micron, as measured by reading the z-average particle size measured by dynamic light scattering (DLS) with a Malvern Zetasizer Nano ZS. The first acrylic polymer (a) may have an average particle size of from 0.05 to 0.5 microns, from 0.08 to 0.2 microns, or from 0.1 to 0.2 microns.

The first acrylic polymer (a) may have a Mw of up to 70,000 Da, such as up to 60,000 Da, up to 50,000 Da, up to 40,000 Da, up to 30,000 Da, up to 20,000 Da, or up to 15,000 Da. The first acrylic polymer (a) may have a Mw of at least 5,000 Da, such as at least 8,000 Da. The first acrylic polymer (a) may have a Mw from 5,000 Da to 70,000 Da, such as from 8,000 Da to 70,000 Da, from 8,000 Da to 50,000 Da, from 8,000 Da to 30,000 Da, from 8,000 Da to 25,000 Da, from 8,000 Da to 20,000 Da, or from 8,000 Da to 15,000 Da.

The first acrylic polymer (a) may have a Tg of at least −50° C., such as at least −30° C., at least −10° C., at least 0° C., at least 10° C., at least 20° C. at least 30° C., at least 50° C., or at least 75° C. The first acrylic polymer (a) may have a Tg of up to 100° C., such as up to 75° C., up to 50° C., up to 30° C., or up to 10° C. The first acrylic polymer (a) may have a Tg of from −50° C. to 100° C., such as from −10° C. to 75° C., such as from 0° C. to 30° C., such as from 0° C. to 50° C., such as from 0° C. to 75° C., such as from 10° C. to 50° C., such as from 10° C. to 75° C., such as from 30° C. to 100° C., such as from 30° C. to 75° C., or such as from 30° C. to 50° C. As used herein, Tg refers to Tg measured by differential scanning calorimetry according to ASTM D3418-15.

The first acrylic polymer (a) may be included in the coating composition in an amount of at least 5 percent by weight, such as at least 10 percent by weight, at least 15 percent by weight, at least 20 percent by weight, at least 25 percent by weight, at least 30 percent by weight, at least 35 percent by weight, at least 40 percent by weight, at least 45 percent by weight, at least 50 percent by weight, at least 55 percent by weight, at least 60 percent, at least 65 percent by weight by weight based on total solids of the first acrylic polymer (a) and the second acrylic polymer (b).

The first acrylic polymer (a) may be included in the coating composition in an amount of up to 70 percent by weight, such as up to 65 percent by weight, up to 60 percent by weight, up to 55 percent by weight, up to 50 percent by weight, up to 45 percent by weight, up to 40 percent by weight, up to 35 percent by weight, up to 30 percent by weight, up to 25 percent by weight, up to 20 percent by weight, up to 15 percent by weight, up to 10 percent by weight based on total solids of the first acrylic polymer (a) and the second acrylic polymer (b).

The first acrylic polymer (a) may be included in the coating composition in an amount of from 5 to 70 percent by weight, such as from 5 to 60 percent by weight, from 5 to 50 percent by weight, from 5 to 40 percent by weight, from 5 to 30 percent by weight, from 5 to 20 percent by weight, from 5 to 10 percent by weight, from 10 to 70 percent by weight, from 10 to 60 percent by weight, from 10 to 50 percent by weight, from 10 to 40 percent by weight, from 10 to 30 percent by weight, from 10 to 20 percent by weight, from 20 to 70 percent by weight, from 20 to 60 percent by weight from 20 to 50 percent by weight, from 20 to 40 percent by weight, from 20 to 30 percent by weight, from 30 to 70 percent by weight, from 30 to 60 percent by weight from 30 to 50 percent by weight, from 30 to 40 percent by weight, from 40 to 70 percent by weight, from 40 to 60 percent by weight, or from 40 to 50 percent by weight, based on total solids of the first acrylic polymer (a) and the second acrylic polymer (b).

The first acrylic polymer (a) may have a hydroxyl value of at least 50 mg KOH/g, such as at least 100 mg KOH/g, or at least 150 mg KOH/g. The first acrylic polymer (a) may have a hydroxyl value of up to 250 mg KOH/g, such as up to 225 mg KOH/g, or up to 200 mg KOH/g, based on the total weight of the first acrylic polymer (a). The hydroxyl value may be determined using ASTM E222-10 (2010). The hydroxyl value of the first acrylic polymer (a) may have a hydroxyl value of from 50 to 250 mg KOH/g, or from 50 to 225 mg KOH/g, or from 50 to 200 mg KOH/g, or from 100 to 250 mg KOH/g, or from 100 to 225 mg KOH/g, or from 100 to 200 mg KOH/g, or from 150 to 250 mg KOH/g, or from 150 to 225 mg KOH/g, or from 150 to 200 mg KOH/g.

As described above, the first ethylenically unsaturated monomer (i) (e.g., containing acid functionality) may be present in stoichiometric excess compared to the reactive solvent (ii). Thus, the resulting first acrylic polymer (a) may contain carboxylic acid functionality resulting from residual or unreacted carboxylic acid groups. The first acrylic polymer (a) may have an acid value of at least 1, such as at least 2, at least 5, at least 10, or at least 25 mg KOH/g resin. The first acrylic polymer (a) may have an acid value of up to 100, such as up to 75, up to 50, up to 40, or up to 35 mg KOH/g resin. The acid value (number of milligrams of KOH per gram of solid required to neutralize the acid functionality in the resin) is a measure of the amount of acid functionality in the resin. The acid value of the first acrylic polymer (a) may have a range of from 1 to 100 mg KOH/g resin, or from 1 to 75 mg KOH/g resin, or from 1 to 50 mg KOH/g resin, or from 1 to 40 mg KOH/g resin, or from 1 to 35 mg KOH/g resin, or from 2 to 100 mg KOH/g resin, or from 2 to 75 mg KOH/g resin, or from 2 to 50 mg KOH/g resin, or from 2 to 40 mg KOH/g resin, or from 2 to 35 mg KOH/g resin, from 5 to 100 mg KOH/g resin, or from 5 to 75 mg KOH/g resin, or from 5 to 50 mg KOH/g resin, or from 5 to 40 mg KOH/g resin, or from 5 to 35 mg KOH/g resin, or from 10 to 100 mg KOH/g resin, or from 10 to 75 mg KOH/g resin, or from 10 to 50 mg KOH/g resin, or from 10 to 40 mg KOH/g resin, or from 10 to 35 mg KOH/g resin, or from 25 to 100 mg KOH/g resin, or from 25 to 75 mg KOH/g resin, or from 25 to 50 mg KOH/g resin, or from 25 to 40 mg KOH/g resin, or from 25 to 35 mg KOH/g resin.

When the polymerization is complete, an amine may be added to the first acrylic polymer (a) in an amount sufficient to provide a pH of from 6 to 10 when the first acrylic polymer (a) is dispersed in water to 30 to 35 percent by weight resin solids at ambient conditions. The pH may be increased by using one or more amines Examples of suitable amines include, but are not limited to, ammonia, diethanol amine, dimethylethanolamine, triethyl amine and diethyl propanol amine Use of the amine allows for formation of a stable, aqueous polymeric dispersion, comprising the first acrylic polymer (a) above dispersed in an aqueous medium. As used herein, "stable dispersion" refers to a liquid having a liquid continuous phase and a dispersed phase, which may be a liquid, a solid or a combination thereof, where the dispersed phase does not agglomerate, coalesce, settle or separate from the continuous phase between the period of time the dispersion is prepared and when it is used, typically a period of time not exceeding six months at ambient conditions. By "ambient" conditions is meant without the application of heat or other energy; for example, when a curable composition undergoes a thermosetting reaction without baking in an oven, use of forced air, irradiation, or the like to prompt the reaction, the reaction is said to occur under ambient conditions. Usually ambient temperature ranges from 60 to 90° F. (15.6 to 32.2° C.), such as a typical room temperature, 72° F. (22.2° C.).

The second acrylic polymer (b) may include an acrylic polymer different from (prepared using different monomers and/or amounts of monomers) the first acrylic polymer (a). The second acrylic polymer (b) may be mixed with the first acrylic polymer (a) after formation of the first acrylic polymer (a) from the reaction mixture. The second acrylic polymer (b) may be an acrylic polymer that is the reaction product of ethylenically unsaturated monomers, which may include polyethylenically unsaturated monomers. The second acrylic polymer (b) may be formed from a reaction mixture including methyl methacrylate and butyl acrylate. The second acrylic polymer (b) may have a Mw of at least 100,000.

Suitable ethylenically unsaturated monomers with only one site of unsaturation for preparation of the second acrylic polymer (b), i.e., mono-ethylenically unsaturated monomers include, but are not limited to, styrene, alpha-methylstyrene, vinyl toluene, 4-methylstyrene, tert-butylstyrene, 2-chlorostyrene, vinylpyridine, vinylpyrrolidone, methyl crotonoate, sodium crotonoate, ethyl acrylate, propyl acrylate, isopropyl acrylate, butyl acrylate, 2-ethylhexyl acrylate, decyl acrylate, hydroxyethyl acrylate, methyl methacrylate, ethyl methacrylate, propyl methacrylate, isopropyl methacrylate, butyl methacrylate, sec-butyl methacrylate, isobutyl methacrylate, n-amyl methacrylate, isoamyl methacrylate, n-hexyl methacrylate, tert-butyl methacrylate, 2-ethylhexyl methacrylate, n-octyl methacrylate, methallyl methacrylate, phenyl methacrylate, benzyl methacrylate, allyl methacrylate, cyclohexyl methacrylate, 2-hydroxyethyl methacrylate, 2-hydroxypropyl methacrylate, N,N-dimethylaminoethyl methacrylate, N,N-diethylamino ethyl methacrylate, tert-butylamino ethyl methacrylate, 2-sulfoethyl methacrylate, trifluoroethyl methacrylate, glycidyl methacrylate, 2-n-butoxyethyl methacrylate, 2-chloroethyl methacrylate, 2-ethylbutyl methacrylate, cinnamyl methacrylate, cyclopentyl methacrylate, 2-ethoxyethyl methacrylate, furfuryl methacrylate, hexafluoroisopropyl methacrylate, 3-methoxybutyl methacrylate, 2-methoxybutyl methacrylate, 2-nitro-2-methylpropyl methacrylate, 2-phenoxyethyl methacrylate, 2-phenylethyl methacrylate, propargyl methacrylate, tetrahydrofurfuryl methacrylate, tetrahydropyranyl methacrylate, methacrylamide, N-methylmethacrylamide, N-ethylmethacrylamide, N,N-diethylmethacrylamide, N,N-dimethylmethacrylamide, N-phenylmethacrylamide, acrylamide, N,N-diethylacrylamide, N-ethylacrylamide, methyl 2-cyanoacrylate, methyl α-chloroacrylate, methacrolein, acrolein, methacrylonitrile, acrylonitrile, and combinations of any of the foregoing.

Specific non-limiting examples of polyethylenically unsaturated monomers that can be used for preparation of the second acrylic polymer (b) include, but are not limited to, diacrylates, such as 1,6-hexanediol diacrylate, 1,4-butanediol diacrylate, ethylene glycol diacrylate, diethylene glycol diacrylate, tetraethylene glycol diacrylate, tripropylene glycol diacrylate, neopentyl glycol diacrylate, 1,4-butanediol dimethacrylate, poly(butanediol) diacrylate, tetraethylene glycol dimethacrylate, 1,3-butylene glycol diacrylate, triethylene glycol diacrylate, triisopropylene glycol diacrylate, polyethylene glycol diacrylate, and/or bisphenol A dimethacrylate; triacrylates, such as trimethylolpropane triacrylate, trimethylolpropane trimethacrylate, pentaerythritol monohydroxy triacrylate, and/or trimethylolpropane triethoxy triacrylate; tetraacrylates, such as pentaerythritol tetraacrylate, and/or di-trimethylolpropane tetraacrylate; and/or pentaacrylates, such as dipentaerythritol (monohydroxy) pentaacrylate.

The second acrylic polymer (b) may be prepared via aqueous emulsion polymerization techniques or via organic solution polymerization techniques with groups capable of salt formation such as acid or amine groups. Upon neutralization of these groups with a base or acid, the polymers can be dispersed into an aqueous medium to form a latex. As used herein, "latex" refers to an emulsion of polymeric particles in an aqueous medium. A suitable commercial example of a second acrylic polymer (b) latex includes, but is not limited to, RHOPLEX SG-30, available from The Dow Chemical Company (Midland, Mich.).

The second acrylic polymer (b) may be included in the coating composition in an amount of at least 30 percent by weight, such as at least 35 percent by weight, at least 40 percent by weight, at least 45 percent by weight, at least 50 percent by weight, at least 55 percent by weight, at least 60 percent by weight, at least 65 percent by weight, at least 70 percent by weight, at least 75 percent by weight, at least 80 percent by weight, at least 85 percent by weight, at least 90 percent by weight, or at least 95 percent by weight, based on total solids of the first acrylic polymer (a) and the second acrylic polymer (b).

The second acrylic polymer (b) may be included in the coating composition in an amount of up to 95 percent by weight, such as up to 90 percent by weight, up to 85 percent by weight, up to 80 percent by weight, up to 75 percent by weight, up to 70 percent by weight, up to 65 percent by weight, up to 60 percent by weight, up to 55 percent by weight, up to 50 percent by weight, up to 45 percent by weight, up to 40 percent by weight, up to 35 percent by weight, up to 30 percent by weight based on total solids of the first acrylic polymer (a) and the second acrylic polymer (b).

The second acrylic polymer (b) may be included in the coating composition in an amount of from 30 to 95 percent by weight, such as from 40 to 95 percent by weight, 50 to 95 percent by weight, from 60 to 95 percent by weight, from 70 to 95 percent by weight, from 80 to 95 percent by weight, from 90 to 95 percent by weight, from 30 to 90 percent by weight, from 40 to 90 percent by weight, from 50 to 90 percent by weight, from 60 to 90 percent by weight, from 70 to 90 percent by weight, from 80 to 90 percent by weight, from 30 to 80 percent by weight, from 40 to 80 percent by weight, from 50 to 80 percent by weight, from 60 to 80 percent by weight, from 70 to 80 percent by weight, from 30 to 70 percent by weight, from 40 to 70 percent by weight, from 50 to 70 percent by weight, from 60 to 70 percent by weight, from 30 to 60 percent by weight, from 40 to 60 percent by weight, or from 50 to 60 percent by weight, based on total solids of the first acrylic polymer (a) and the second acrylic polymer (b).

The coating composition may be formulated to include a variety of optional ingredients and/or additives, such as catalysts, initiators, colorants, biocides, biostats, reinforcements, thixotropes, accelerators, surfactants, coalescing agents, plasticizers, extenders, stabilizers, corrosion inhibitors, diluents.

The coating composition including the first acrylic polymer (a) and the second acrylic polymer (b) may contain little or no volatile organic compounds (VOCs), such as below 50 g/L, below 25 g/L, below 5 g/L, or 0 g/L. As used herein, the term "volatile organic compound" is defined per EPA Method 24, and VOC content of the coating composition is determined using EPA Method 24.

The present invention is also directed to a method of coating a substrate with a coating composition described herein. The method includes applying the coating composition over at least a portion of a substrate. The coating composition can be applied in liquid form and coalesced to form a coating, such as dried at temperature conditions in the range of −10° C. to 50° C.

Formulation of the coating composition involves the process of selecting and admixing appropriate coating ingredients in the correct proportions to provide a composition, such as a paint with specific processing and handling properties, as well as a final dry paint film with the desired properties. The aqueous coating compositions may be applied by conventional application methods such as, for example, brushing, roller application, and spraying methods such as, for example, air-atomized spray, air-assisted spray, airless spray, high volume low pressure spray, and air-assisted airless spray.

Suitable substrates over which the coating compositions may be applied include, but are not limited to, architectural substrates, such as metallic or non-metallic substrates including: concrete, stucco, cement board, MDF (medium density fiberboard) and particle board, gypsum board, wood, stone, metal, plastics (e.g., vinyl siding and recycled plastics), wall paper, textile, plaster, fiberglass, ceramic, etc., which may be pre-primed by waterborne or solvent borne primers. The architectural substrate may be an interior wall (or other interior surface) of a building or residence. The architectural substrate may be an outdoor substrate exposed to outdoor conditions. The architectural substrate may be smooth or textured.

When applied to a substrate and coalesced to form a coating thereon, the coating exhibits good stain resistance, having a stain rating of at least 45, such as at least 50, at least 55, at least 60, at least 65, at least 70, at least 75, at least 80, or at least 85. Stain rating is determined using the Stain Resistance Test Method described below in the Examples. The coating may exhibit the good stain resistance to both oil-based and water-based stains, making the coating omniphobic. When applied to a substrate and coalesced to form a coating thereon, the coating may exhibit an improved stain resistance compared to the same coating composition not including the first acrylic polymer (a).

EXAMPLES

Illustrating the invention are the following examples that are not to be considered as limiting the invention to their details.

Polymer Example A

A water dispersible polymer (Polymer A) was prepared with the following ingredients:

TABLE 1

| | Ingredients | Amount (gram) |
|---|---|---|
| Charge 1: | Reactive Solvent[1] | 256.59 |
| Charge 2: | Di-tertiary-amyl peroxide | 18.2 |
| (premixed) | Reactive Solvent[1] | 22.5 |
| | Dipropylene glycol monomethyl ether | 7.87 |
| Charge 2A: (Rinse) | Dipropylene glycol monomethyl ether | 5.98 |
| Charge 3: | Iso-bornyl acrylate | 283.54 |
| (premixed) | Hydroxy ethyl methacrylate | 213.23 |
| | Alpha-methyl styrene dimer | 26.47 |
| | Ethyl hexyl acrylate | 45.67 |
| | Acrylic acid | 125.98 |
| Charge 3A: (Rinse) | Dipropylene glycol monomethyl ether | 9.9 |
| Charge 4: | Di-methyl ethanol amine | 51.7 |
| Charge 5: | Deionized water | 2132.3 |

[1]CARDURA E10P glycidyl ester, available from Hexion (Columbus, OH)

To a suitable reaction vessel equipped with a stirrer, reflux condenser, thermometer, heating mantle, and nitrogen inlet, Charge 1 was added at ambient temperature (20° C. to 27° C.). The temperature was then increased to 160° C., at which time a premix of Charge 2 was added over 270 minutes, and Charge 3 was added over 240 minutes. Upon completion of Charges 2 and 3, Charge 2A and Charge 3A were added as a rinse for Charge 2 and Charge 3, respectively, followed by a hold for an additional 60 minutes. Thereafter the reaction mixture was cooled to 120° C. At this temperature Charge 4 was added over 10 minutes, followed by a 10 minute hold. The polymeric product (Polymer A) thus formed was then diluted with Charge 5. The final product had a solids of 31.0 wt. % and a Mw of 9,389 Da. Non-volatile content (solids) was measured by comparing initial sample weights to sample weights after exposure to 110° C. for 1 hour. Polymer A had a Brookfield Viscosity of 186 CPS, measured at 25° C. on a Brookfield Viscometer DV-II+Pro using spindle #3 at 100 RPM. Polymer A had an average particle size of 35.2 nm as measured by reading the z-average particle size measured by dynamic light scattering (DLS) with a Malvern Zetasizer Nano ZS.

Polymer Example B

Polymer B was prepared in the same way as Polymer A, except, isobornyl acrylate was replaced by additional ethyl hexyl acrylate. The final product had a solids content of 31.94 wt. % (1 hour at 110° C.) and a Mw of 14,089 Da. Polymer B had a Brookfield Viscosity of 254 CPS, measured at 25° C. on a Brookfield Viscometer DV-II+Pro using spindle #3 at 100 RPM. Polymer B had an average particle size of 95 nm as measured by reading the z-average particle size measured by dynamic light scattering (DLS) with a Malvern Zetasizer Nano ZS.

Polymer Example C

Polymer C was prepared in the same way as Polymer A, except, isobornyl acrylate was replaced by additional ethyl hexyl acrylate and 5.4 wt. % (based on total solids of Polymer C) of polydimethyl siloxane acrylate (molecular weight 5,000 Da, available from Shin Etsu, Chemical Company (Tokyo, Japan)) was added in the initial charge of CARDURA E. The final product had a solids content of 31.5 wt. % (1 hour at 110° C.) and a Mw of 12,201 Da. Polymer C had a Brookfield Viscosity of 400 CPS, measured at 25° C. on a Brookfield Viscometer DV-II+Pro using spindle #3 at 100 RPM. Polymer C had an average particle size of 38.6 nm as measured by reading the z-average particle size measured by dynamic light scattering (DLS) with a Malvern Zetasizer Nano ZS.

Polymer Example D

Polymer D was prepared in the same way as Polymer A, except 5.4 wt. % (based on total solids of Polymer D) of polydimethyl siloxane acrylate (molecular weight 5,000 Da (as reported by manufacturer), available from Shin Etsu, Chemical Company (Tokyo, Japan)) was used in the initial charge of CARDURA E. The final product had a solids content of 31.6 wt. % (1 hour at 110° C.) and a Mw of 9,170 Da. Polymer D had a Brookfield Viscosity of 76 CPS, measured at 25° C. on a Brookfield Viscometer DV-II+Pro using spindle #3 at 100 RPM. Polymer D had an average particle size of 82 nm as measured by reading the z-average particle size measured by dynamic light scattering (DLS) with a Malvern Zetasizer Nano ZS.

Polymer Example E

A water dispersible polymer (Polymer E) was prepared with the following ingredients:

TABLE 2

|  | Ingredients | Amount (gram) |
| --- | --- | --- |
| Charge 1: | Diethylene glycol monobutyl ether | 157.5 |
|  | Deionized water | 16.5 |
| Charge 2: (premixed) | Tertiary butyl peroxy acetate | 10.9 |
|  | Diethylene glycol monobutyl ether | 105.0 |
| Charge 2A: (Rinse) | Diethylene glycol monobutyl ether | 7.5 |
| Charge 3: (premixed) | Styrene | 190.5 |
|  | Butyl acrylate | 222.2 |
|  | Butyl methacrylate | 114 |
|  | Poly-dimethyl siloxane acrylate | 54.2 |
|  | Acrylic acid | 56.5 |
| Charge 3A: (Rinse) | Diethylene glycol monobutyl ether | 16.5 |
| Charge 4: | Di-methyl ethanol amine | 69.8 |
| Charge 5: | Deionized water | 900.0 |

To a suitable reaction vessel equipped with a stirrer, reflux condenser, thermometer, heating mantle, and nitrogen inlet, Charge 1 was added at ambient temperature (20° C. to 27° C.). The temperature was then increased to reflux (105° C.), at which time a premix of Charge 2 and Charge 3 were added over 180 minutes. Upon completion of Charges 2 and 3, Charge 2A and Charge 3A were added as a rinse for Charge 2 and Charge 3, respectively, followed by a hold for an additional 60 minutes. Thereafter the reaction mixture was cooled to 80° C. At this temperature Charge 4 was added over 20 minutes, followed by a 10 minute hold. The polymeric product thus formed (Polymer E) was then diluted with Charge 5. The final product had a solids content of 30.8 wt. % (1 hour at 110° C.) and a Mw of 46,388 Da. Polymer E had a Brookfield Viscosity of 1,020,000 CPS, measured at 25° C. on a Brookfield Viscometer DV-II+Pro using spindle #7 at 2 RPM. Polymer E had an average particle size of 180 nm as measured by reading the z-average particle size measured by dynamic light scattering (DLS) with a Malvern Zetasizer Nano ZS.

The following Base Formulation and Stain Resistant Test Method were used in the Examples.

Base Formulation

Coating compositions were prepared according to the Base Formulation in Table 3 with different resin blends (cf. Formulation Examples 1-13 described below), keeping the total resin solids constant by weight. The grind ingredients were mixed using a high-speed Cowles disperser at sufficient speed to create a vortex where the blade meets the paint. After addition of the matting agent, the grind process resumed for 20 minutes, followed by adding the letdown ingredients using a conventional lab mixer and mixing for 30 minutes after the last addition.

TABLE 3

| Item | Amount (gram) |
| --- | --- |
| Grind | |
| Water | 100.0 |
| PANGEL S9[2] | 3.0 |
| TYLOSE HX 6000[3] YG4 | 2.0 |
| DREWPLUS T-4507[4] | 2.0 |
| TAMOL 731A[5] | 5.0 |
| ZETASPERSE 179[6] | 6.0 |
| MINEX 4[7] | 92.0 |
| Letdown | |
| Water | 71.0 |
| ACRYSOL RM-2020 NPR[8] | 17.0 |
| TRONOX CR-826S[9] | 387.0 |
| DREWPLUS T-4507[4] | 8.0 |
| Resin Blend | 430.0 |
| OPTIFILM enhancer 400[10] | 15.0 |
| ACTICIDE MBS[11] | 1.2 |

[2]Magnesium silicate rheology modifier, available from The Carey Company (Addison, IL)
[3]Hydroxyethylcellulose rheology modifier, available from SETylose USA (Plaquemine, LA)
[4]Mineral oil defoamer, available from Ashland (Columbus, OH)
[5]Dispersant available from The Dow Chemical Company (Midland, MI)
[6]Nonionic surfactant, available from Evonik Industries AG (Essen, Germany)
[7]Aluminum silicate matting agent, available from The Cary Company (Addison, IL)
[8]Hydrophobically modified ethylene oxide urethane rheology modifier, available from The Dow Chemical Company (Midland, MI)
[9]Rutile titanium dioxide slurry, available from Tronox Limited (Stamford, CT)
[10]Coalescent, available from The Eastman Chemical Company (Kingsport, TN)
[11]Biocide, available from Thor Specialties, Inc. (Shelton, CT)

Stain Resistance Test Method

The Stain Resistance Test Method is a more challenging, modified version of ASTM D4828 to target stain removal using fewer scrub cycles Films were prepared by drawing down the coating composition onto black Leneta scrub panels (Form P121-10N) using a 7-mil horseshoe drawdown bar. The films were dried at ambient laboratory conditions for 7 days before stain application. Before applying stains, color was measured of the unstained coated panel using a Datacolor 850 spectrophotometer using 9 mm size aperture. The following stains were applied to the paint films via one-inch strips of filter paper saturated with the following fluids: red wine (Holland House red cooking wine), grape juice (Welch's grape juice), java concentrate (Pur Java concentrate—Honduran Dark Roast), and hot coffee (Kirkland Signature 100% Colombian (Dark Roast-fine grind)) (70° C.). The following stains were directly applied to the paint films: mustard (French's mustard), red lipstick (CoverGirl 305 "Hot" lipstick), green crayon (Crayola), graphite powder (Alfa Aesar graphite—99.9% pure), and Leneta staining medium (ST-1). After 30 minutes, the lipstick and Leneta medium were wiped off, and the paint films were rinsed and placed in a washability machine (Gardner Abrasion Tester). A damp cellulosic sponge containing 10 g of water and 6 g of SOFT SCRUB (cleanser, Henkel Corporation (Dusseldorf, Germany)) was placed in a 1000 g holder, and the panels were scrubbed for 6 cycles. After rinsing the panels and drying for at least 2 hours, color was again measured for the coated panels using the spectrophotometer so that a ΔE color change for each coated panel could be generated by the spectrophotometer. Each of the 9 stains was rated on an integer scale of 0 for no stain removal to 10 for complete stain removal based on the measured ΔE color change of the coated panel using the following Table 4:

TABLE 4

Delta E Color Change

| Rating | Red Wine | Grape Juice | Java Concentrate | Hot Coffee | Mustard | Lipstick | Green Crayon | Graphite | Lenata Oil |
|---|---|---|---|---|---|---|---|---|---|
| 0 | >6.30 | >6.00 | >4.00 | >6.00 | >25.00 | >32.00 | >12.20 | >26.50 | >22.00 |
| 1 | 5.69-6.30 | 5.07-6.00 | 3.62-4.00 | 5.33-6.00 | 22.29-25.00 | 27.32-32.00 | 10.91-12.20 | 22.01-26.50 | 18.51-22.00 |
| 2 | 5.11-5.68 | 4.50-5.06 | 3.23-3.61 | 4.73-5.32 | 19.58-22.28 | 22.63-27.31 | 9.61-10.90 | 17.68-22.00 | 16.01-18.50 |
| 3 | 4.53-5.10 | 3.93-4.49 | 2.84-3.22 | 4.12-4.72 | 16.85-19.57 | 18.01-22.62 | 8.31-9.60 | 14.96-17.67 | 13.50-16.00 |
| 4 | 3.39-4.52 | 3.36-3.92 | 2.45-2.83 | 3.52-4.11 | 12.24-16.84 | 14.51-18.00 | 7.01-8.30 | 12.24-14.95 | 11.01-13.49 |
| 5 | 2.81-3.38 | 2.79-3.35 | 2.07-2.44 | 2.92-3.51 | 9.52-12.23 | 11.01-14.50 | 5.70-7.00 | 9.52-12.23 | 8.51-11.00 |
| 6 | 2.23-2.80 | 2.22-2.78 | 1.68-2.06 | 2.32-2.91 | 6.80-9.51 | 7.51-11.00 | 4.41-5.69 | 6.80-9.51 | 6.01-8.50 |
| 7 | 1.66-2.22 | 1.65-2.21 | 1.29-1.67 | 1.71-2.31 | 4.25-6.79 | 4.51-7.50 | 3.11-4.40 | 4.25-6.79 | 3.81-6.00 |
| 8 | 1.09-1.65 | 1.08-1.64 | 0.90-1.28 | 1.11-1.70 | 1.91-4.24 | 1.91-4.50 | 1.81-3.10 | 1.91-4.24 | 1.91-3.80 |
| 9 | 0.50-1.08 | 0.50-1.07 | 0.50-0.89 | 0.51-1.10 | 0.57-1.90 | 0.51-1.90 | 0.51-1.80 | 0.51-1.90 | 0.51-1.90 |
| 10 | <0.50 | <0.50 | <0.50 | <0.50 | <0.56 | <0.50 | <0.50 | <0.50 | <0.50 |

A stain rating ranging from 0 to 90 was obtained by summing the rating for each individual stain.

Formulation Examples 1-5

Comparative Examples 1, 6, and 11 included the same coating composition having 100 wt. % RHOPLEX SG-30 in place of the "resin blend" in the Base Formulation shown in Table 3. Coating compositions for Examples 2-5 were formed by blending Polymers A-D, respectively, at 30% by weight based on total resin solids with RHOPLEX SG-30, as the "resin blend" of the Base Formulation as shown in Table 3. Coating compositions for Examples 7-10 were formed by blending Polymers A-D (first acrylic polymer (a)), respectively, at 50% by weight based on total resin solids with RHOPLEX SG-30 (second acrylic polymer (b)), as the "resin blend" of the Base Formulation as shown in Table 3.

The stain ratings for Examples 1-5 were determined as a first set according to the Stain Resistance Test Method. The stain ratings for Examples 6-10 were determined as a second set according to the Stain Resistance Test Method. The stain ratings for Examples 11-13 were determined as a third set according to the Stain Resistance Test Method.

As can be seen in Table 5, an over 55% improvement in stain resistance was achieved for Examples 2-5 compared to Comparative Example 1. An additional boost in stain resistance was observed when the acrylic dispersions were blended at 50% on total resin solids in the Base Formulation in Examples 7-10 as shown in Table 6. Over 65% improvement in stain resistance was achieved using these blends compared to the Base Formulation including only the Base Acrylic control resin (Comparative Example 6).

TABLE 5

Formulations containing 30% First Acrylic Polymer (a)/70% Second Acrylic Polymer (b)

| Stain | CE. 1 RHOPLEX SG-30 Only | Ex. 2 Polymer A | Ex. 3 Polymer B | Ex. 4 Polymer C | Ex. 5 Polymer D |
|---|---|---|---|---|---|
| Wine | 3 | 7 | 7 | 8 | 7 |
| Grape Juice | 4 | 9 | 7 | 8 | 9 |
| Java Concentrate | 4 | 5 | 7 | 6 | 6 |
| Hot Coffee | 1 | 5 | 5 | 4 | 4 |
| Mustard | 2 | 3 | 3 | 3 | 3 |
| Lipstick | 3 | 6 | 5 | 7 | 7 |
| Green Crayon | 9 | 10 | 10 | 10 | 9 |
| Graphite | 6 | 9 | 9 | 9 | 9 |
| Leneta Oil | 7 | 9 | 8 | 8 | 8 |
| Total | 39 | 63 | 61 | 63 | 62 |
| % Improvement | — | 62% | 56% | 62% | 59% |

TABLE 6

Formulations containing 50% First Acrylic Polymer (a)/50% Second Acrylic Polymer (b)

| Stain | CE. 6 RHOPLEX SG-30 Only | Ex. 7 Polymer A | Ex. 8 Polymer B | Ex. 9 Polymer C | Ex. 10 Polymer D |
|---|---|---|---|---|---|
| Wine | 4 | 8 | 9 | 9 | 9 |
| Grape Juice | 6 | 9 | 9 | 9 | 10 |
| Java Concentrate | 5 | 7 | 7 | 8 | 6 |
| Hot Coffee | 2 | 6 | 5 | 5 | 6 |
| Mustard | 1 | 2 | 2 | 2 | 4 |

TABLE 6-continued

Formulations containing 50% First Acrylic Polymer (a)/50% Second Acrylic Polymer (b)

| Stain | CE. 6 RHOPLEX SG-30 Only | Ex. 7 Polymer A | Ex. 8 Polymer B | Ex. 9 Polymer C | Ex. 10 Polymer D |
|---|---|---|---|---|---|
| Lipstick | 3 | 8 | 7 | 8 | 8 |
| Green Crayon | 8 | 9 | 10 | 9 | 10 |
| Graphite | 5 | 9 | 9 | 9 | 9 |
| Leneta Oil | 6 | 9 | 9 | 9 | 9 |
| Total | 40 | 67 | 67 | 68 | 71 |
| % Improvement | — | 68% | 68% | 70% | 78% |

In comparison, there is less improvement in stain resistance when the inventive resins are synthesized using a conventional solvent-based method as in Polymer Example E. Table 7 compares formulations containing acrylic dispersions blended at 50% on total resin solids in the Base Formulation. Comparative Example 12 shows a 49% improvement in stain resistance using resin synthesized via the conventional method, whereas Example 13 (the identical coating composition compared to Example 9) containing the inventive resin shows a larger 74% improvement in stain resistance. Moreover, the inventive resin is much lower in molecular weight and viscosity, making it easier to process in formulation.

TABLE 7

Formulations containing comparative 50% First Acrylic Polymer (a)/50% Second Acrylic Polymer (b)

| Stain | CE. 11 RHOPLEX SG-30 Only | CE. 12 Polymer E | Ex. 13 Polymer C |
|---|---|---|---|
| Wine | 4 | 8 | 9 |
| Grape Juice | 5 | 8 | 8 |
| Java Concentrate | 5 | 7 | 7 |
| Hot Coffee | 2 | 4 | 4 |
| Mustard | 2 | 4 | 4 |
| Lipstick | 3 | 2 | 7 |
| Green Crayon | 8 | 8 | 10 |
| Graphite | 4 | 9 | 10 |
| Leneta Oil | 6 | 8 | 9 |
| Total | 39 | 58 | 68 |
| % Improvement | — | 49% | 74% |

In view of the foregoing description and examples the present invention thus relates inter alia to the subject matter of the following clauses and claims though being not limited thereto.

Clause 1: A coating composition comprising: (a) a first acrylic polymer formed from a reaction mixture comprising: (i) an ethylenically unsaturated monomer comprising an acid group or an amine group; (ii) a reactive solvent reactive with the ethylenically unsaturated monomer (i); and (iii) a second monomer reactive with ethylenically unsaturated monomer (i); and (b) a second acrylic polymer different from the first acrylic polymer, wherein the second acrylic polymer (b) has a Mw of at least 100,000 Da.

Clause 2: The coating composition of clause 1, wherein a volatile organic content (VOC) of the coating composition is less than 50 g/L.

Clause 3: The coating composition of clause 1 or 2, wherein the reactive solvent (ii) is completely consumed in an addition reaction with the ethylenically unsaturated monomer (i).

Clause 4: The coating composition of any of clauses 1-3, wherein the reactive solvent (ii) is ethylenically saturated and/or comprises oxirane functionality, such as the reactive solvent (ii) comprising a glycidyl ester of an aliphatic saturated carboxylic acid.

Clause 5: The coating composition of any of clauses 1-4, wherein the first acrylic polymer (a) has an average particle size of less than 0.5 microns.

Clause 6: The coating composition of any of clauses 1-5, wherein the coating composition is essentially free of a non-reactive organic solvent.

Clause 7: The coating composition of any of clauses 1-6, wherein the first acrylic polymer (a) comprises 5 to 50 percent by weight based on total solids of the first acrylic polymer (a) and the second acrylic polymer (b) in the coating composition.

Clause 8: The coating composition of any of clauses 1-7, wherein the ethylenically unsaturated monomer (i) comprises an ethylenically unsaturated acid functional monomer, such as acrylic and/or methacrylic acid.

Clause 9: The coating composition of any of clauses 1-8, wherein the second acrylic polymer (b) comprises a latex acrylic polymer.

Clause 10: The coating composition of any of clauses 1-9, wherein the first acrylic polymer (a) has a Mw of up to 70,000 Da.

Clause 11: The coating composition of any of clauses 1-10, wherein the first acrylic polymer (a) has a Tg of from −50° C. to 100° C.

Clause 12: A coating formed from the coating composition of any of clauses 1-11, the coating exhibiting an improved stain resistance compared to a coating formed from the same coating composition not including the first acrylic polymer (a).

Clause 13: The coating of clause 12, wherein the coating exhibits a stain rating of at least 45.

Clause 14: A substrate at least partially coated with a coating formed from the coating composition of any of clauses 1-11.

Clause 15: The substrate of clause 14, wherein the substrate comprises an architectural component.

Clause 16: A method of preparing a coating composition for imparting improved stain resistance comprising: reacting to form (a) a first acrylic polymer: (i) an ethylenically unsaturated monomer comprising an acid group or an amine group; (ii) a reactive solvent reactive with the ethylenic ally unsaturated monomer (i); and (iii) a second monomer reactive with ethylenic ally unsaturated monomer (i); and mixing (b) a second acrylic polymer different from the first acrylic polymer (a) with the first acrylic polymer (a) to form a coating composition, wherein the second acrylic polymer (b) has a Mw of at least 100,000.

Clause 17: The method of clause 16, wherein the reactive solvent (ii) is ethylenically saturated and/or comprises oxirane functionality, such as the reactive solvent (ii) comprising a glycidyl ester of an aliphatic saturated carboxylic acid.

Clause 18: The method of clause 16 or 17, wherein the first acrylic polymer (a) comprises 5 to 50 percent by weight based on total solids of the first acrylic polymer (a) and the second acrylic polymer (b) in the coating composition.

Clause 19: The method of any of clauses 16-18, wherein the ethylenically unsaturated monomer (i) comprises an ethylenically unsaturated acid functional monomer, such as acrylic and/or methacrylic acid.

Clause 20: The method of any of clauses 16-19, wherein a volatile organic content (VOC) of the coating composition is less than 50 g/L.

Clause 21: A method for improving stain resistance of a substrate comprising:

providing a coating composition comprising: (a) a first acrylic polymer formed from a reaction mixture comprising: (i) an ethylenically unsaturated monomer comprising an acid group or an amine group; (ii) a reactive solvent reactive with the ethylenically unsaturated monomer (i); and (iii) a second monomer reactive with ethylenically unsaturated monomer (i); and (b) a second acrylic polymer different from the first acrylic polymer (a), wherein the second acrylic polymer (b) has a Mw of at least 100,000; and applying the coating composition to a substrate.

Whereas particular aspects of this invention have been described above for purposes of illustration, it will be evident to those skilled in the art that numerous variations of the details of the present invention may be made without departing from the invention as defined in the appended claims.

The invention claimed is:

1. A coating composition comprising:
   (a) a first acrylic polymer formed from a reaction mixture comprising:
      (i) an ethylenically unsaturated monomer comprising an acid group or an amine group;
      (ii) a reactive solvent reactive with the ethylenically unsaturated monomer (i); and
      (iii) a second monomer reactive with ethylenically unsaturated monomer (i); and
   (b) a second acrylic polymer different from the first acrylic polymer, wherein the second acrylic polymer (b) has a Mw of at least 100,000 Da.

2. The coating composition of claim 1, wherein a volatile organic content (VOC) of the coating composition is less than 50 g/L.

3. The coating composition of claim 1, wherein the reactive solvent (ii) is completely consumed in an addition reaction with the ethylenically unsaturated monomer (i).

4. The coating composition of claim 1, wherein the reactive solvent (ii) is ethylenically saturated and/or comprises oxirane functionality.

5. The coating composition of claim 1, wherein the first acrylic polymer (a) has an average particle size of less than 0.5 microns.

6. The coating composition of claim 1, wherein the coating composition is essentially free of a non-reactive organic solvent.

7. The coating composition of claim 1, wherein the first acrylic polymer (a) comprises 5 to 50 percent by weight based on total solids of the first acrylic polymer (a) and the second acrylic polymer (b) in the coating composition.

8. The coating composition of claim 1, wherein the ethylenically unsaturated monomer (i) comprises an ethylenically unsaturated acid functional monomer.

9. The coating composition of claim 1, wherein the second acrylic polymer (b) comprises a latex acrylic polymer.

10. The coating composition of claim 1, wherein the first acrylic polymer (a) has a Mw of up to 70,000 Da.

11. The coating composition of claim 1, wherein the first acrylic polymer (a) has a Tg of from −50° C. to 100° C.

12. A coating formed from the coating composition of claim 1, the coating exhibiting an improved stain resistance compared to a coating formed from the same coating composition not including the first acrylic polymer (a).

13. The coating of claim 12, wherein the coating exhibits a stain rating of at least 45 according the Stain Resistance Test Method.

14. A substrate at least partially coated with a coating formed from the coating composition of claim 1.

15. The substrate of claim 14, wherein the substrate comprises an architectural component.

16. A method of preparing a coating composition for imparting improved stain resistance comprising:
   reacting to form (a) a first acrylic polymer:
      (i) an ethylenically unsaturated monomer comprising an acid group or an amine group;
      (ii) a reactive solvent reactive with the ethylenically unsaturated monomer (i); and
      (iii) a second monomer reactive with ethylenically unsaturated monomer (i); and
   mixing (b) a second acrylic polymer different from the first acrylic polymer (a) with the first acrylic polymer (a) to form a coating composition, wherein the second acrylic polymer (b) has a Mw of at least 100,000.

17. The method of claim 16, wherein the reactive solvent (ii) is ethylenically saturated and/or comprises oxirane functionality.

18. The method of claim 16, wherein the first acrylic polymer (a) comprises 5 to 50 percent by weight based on total solids of the first acrylic polymer (a) and the second acrylic polymer (b) in the coating composition.

19. The method of claim 16, wherein the ethylenically unsaturated monomer (i) comprises an ethylenically unsaturated acid functional monomer.

20. The method of claim 16, wherein a volatile organic content (VOC) of the coating composition is less than 50 g/L.

* * * * *